Patented July 22, 1952

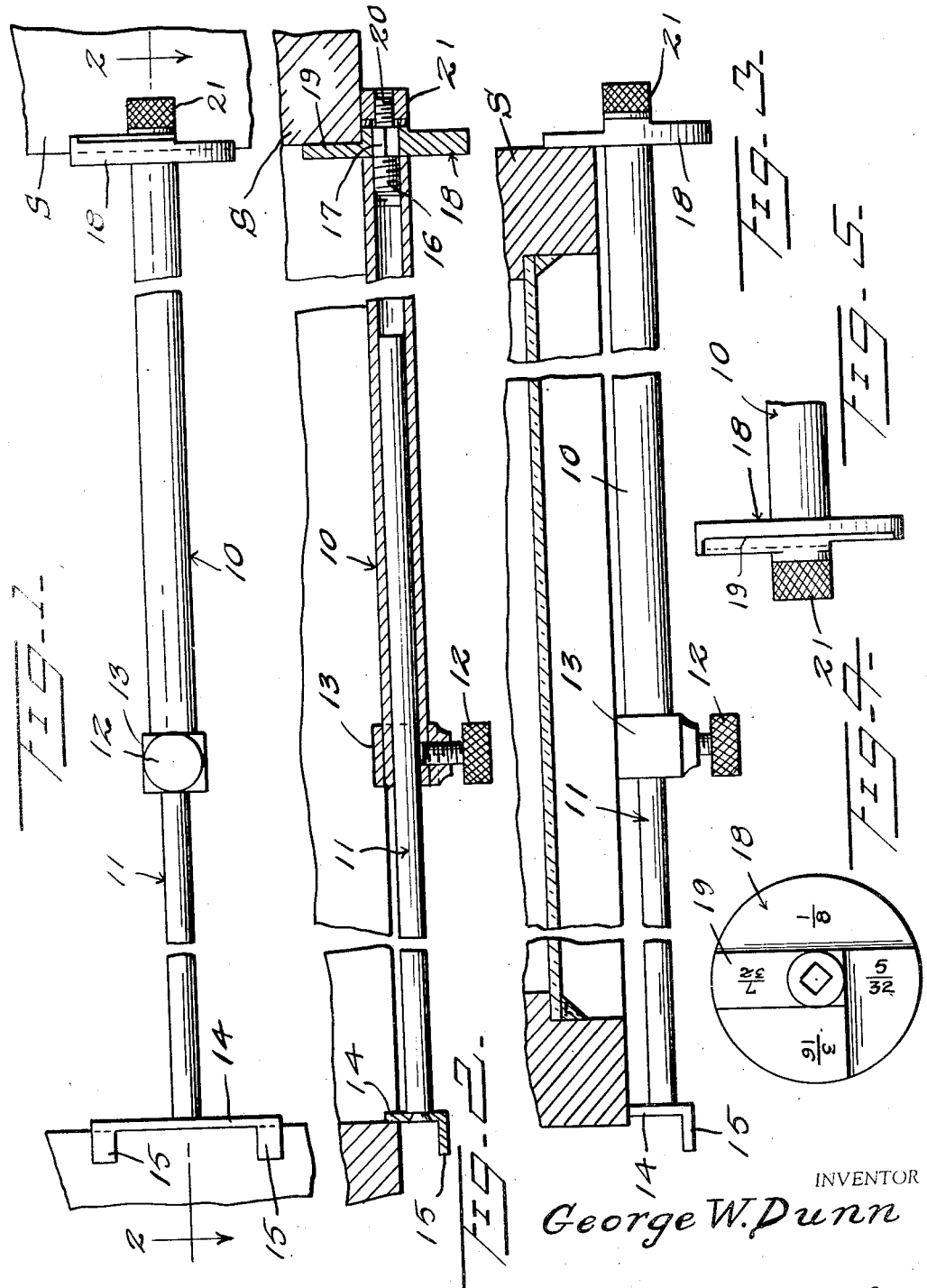

2,603,880

UNITED STATES PATENT OFFICE 2,603,880

DOOR WINDOW AND PANEL FITTING GAUGE

George W. Dunn, Portland, Oreg.

Application September 17, 1951, Serial No. 246,917

2 Claims. (Cl. 33—194)

This invention relates to a gauge for use in gauging doors and sashes.

In the hanging of doors and the mounting of sashes in window frames, a predetermined clearance is provided so as to allow for expansion of the doors and sashes. A substantial amount of time is required by the carpenter in carefully measuring the door or window frames and in determining whether the frame is squared properly, so that proper allowance may be made for the necessary clearance along the vertical and horizontal edges of the doors and sashes.

Another object of this invention is to provide a device of this kind which is collapsible so that it may be carried with other tools.

A further object of this invention is to provide a gauge of this kind which is simple in construction and will provide an accurate and quick measurement with proper clearance allowance so that doors and sashes may be fitted in less time than has heretofore been required.

With the above and other objects in view, my invention consists in the arrangement, combination and details of construction disclosed in the drawing and specification, and then more particularly pointed out in the appended claims.

In the drawing,

Figure 1 is a detail side elevation of a door or sash gauge constructed according to an embodiment of this invention, Figure 2 is a sectional view taken on the line 2—2 of Figure 1, Figure 3 is a detail side elevation of the gauge showing the latter in sash or door measuring position, Figure 4 is an end elevation of the gauge plate removed from the device, Figure 5 is a fragmentary side elevation of the gauge end of the device.

Referring to the drawing, the numerals 10 and 11 designate generally a pair of telescopically arranged members, the member 10 being an elongated tube and the member 11 being a rod telescoping into the tube 10. The rod 11 is lengthwise adjusted within the tube 10 by means of a set screw 12 which is threaded through a collar 13 fixed on the inner end of the tube 10.

The rod 11 at its outer end has a right angularly disposed plate 14 fixed thereto and the plate 14 has extending therefrom a pair of right angularly disposed ears 15. The tube 10 at its outer end has threaded thereinto a plug 16 formed with a polygonal stud 17 on which is mounted a gauge disc or plate 18. The gauge disc or plate 18 is formed with a flat inner side and is formed with a stepped outer side, as indicated at 19 in Figure 4. There are a series of these steps 19 formed on the gauge member 18, the purpose for which will be hereinafter described.

A threaded stud 20 extends from the polygonal stud 17 and a nut 21 is threaded onto the stud 20 and provides for securing the plate 18 on the polygonal stud and in abutting relation to the outer end of the tube 10.

In the use and operation of this gauge, the device is disposed between the vertical sides of a door opening and the stepped plate 18 is disposed with a selected step thereof engaging the inner side of the door frame. Plate 14 is disposed in contacting relation with the opposite side of the door frame and set screw 12 is tightened so as to firmly secure rod 11 in its endwise adjusted position. The steps 19 of plate 18 are provided in selected measurements so as to provide for the desired clearance at the opposite vertical edges of the door when the latter is hung on the hinges. After the gauge has been disposed within the door opening, the gauge is then applied to the door or sash.

In Figure 3 the gauge is shown as being applied to the sash for measuring the width of the sash for the window opening. The inner side of the gauge plate 18 is disposed in abutting relation to one edge of the sash and plate 14 is then disposed on the adjacent face of the sash S as shown in Figure 3. A mark is then made along the outer edge of plate 14 and the sash S may then be trimmed along the mark made at the outer side of the plate 14. The sash when trimmed as hereinbefore described, will readily fit into the window opening with a predetermined clearance so that the sash will not stick when it expands under weather conditions.

The same procedure is applied when the gauge is used for a door. This gauge will serve to speed up the hanging of doors and the fitting of window sashes and it will be understood that the gauge may be applied to different points in a door opening or frame so as to accurately measure the space between the vertical sides of the door frame in the event the frame may be slightly warped or the vertical sides slightly out of square with respect to the top and bottom portions of the door opening or frame.

I do not mean to confine myself to the exact details of construction herein disclosed, but claim all variations falling within the purview of the appended claims.

What I claim is:

1. A gauge for door and window sash openings comprising an elongated member formed of a pair of telescopic members, a plate fixed to the outer end of one of said pair of members, and a second plate fixed to the outer end of the other one of said pair of members, said second plate having a flat inner face and a stepped outer face, the steps of said second plate constituting clearance allowances cooperating with the outer side of said first plate in measuring a door or sash with allowance for a predetermined clearance.

2. A gauge for door and window sash openings comprising an elongated tubular member, a rod telescoping into said member, means securing said rod in adjusted position in said member, a plate fixed to the outer end of said rod, a pair of right angularly disposed fingers extending from one edge of said plate, a plug threaded into the outer end of said tubular member, a polygonal stud carried by said plug, a stepped disc mounted on said stud, a threaded stud extending from said polygonal stud, and a nut on said threaded stud removably holding said disc on said polygonal stud, said disc having a flat inner face and a stepped outer face, the steps of said disc constituting graduated clearance allowances.

GEORGE W. DUNN.

No references cited.